Aug. 6, 1935.  R. RIEGLER  2,010,439
DIP PAN FOR FLAKING MACHINES
Filed June 1, 1929    2 Sheets-Sheet 1
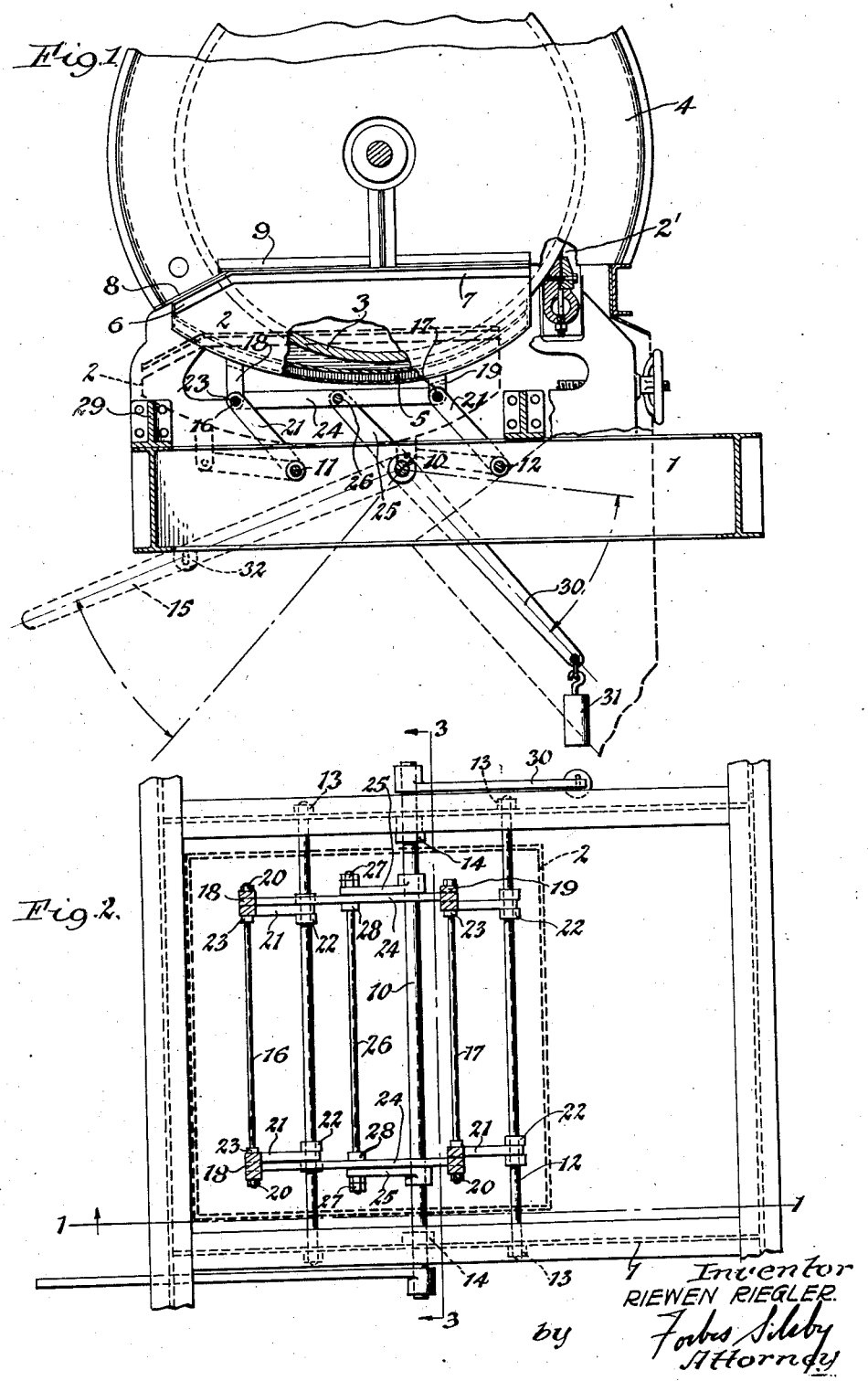

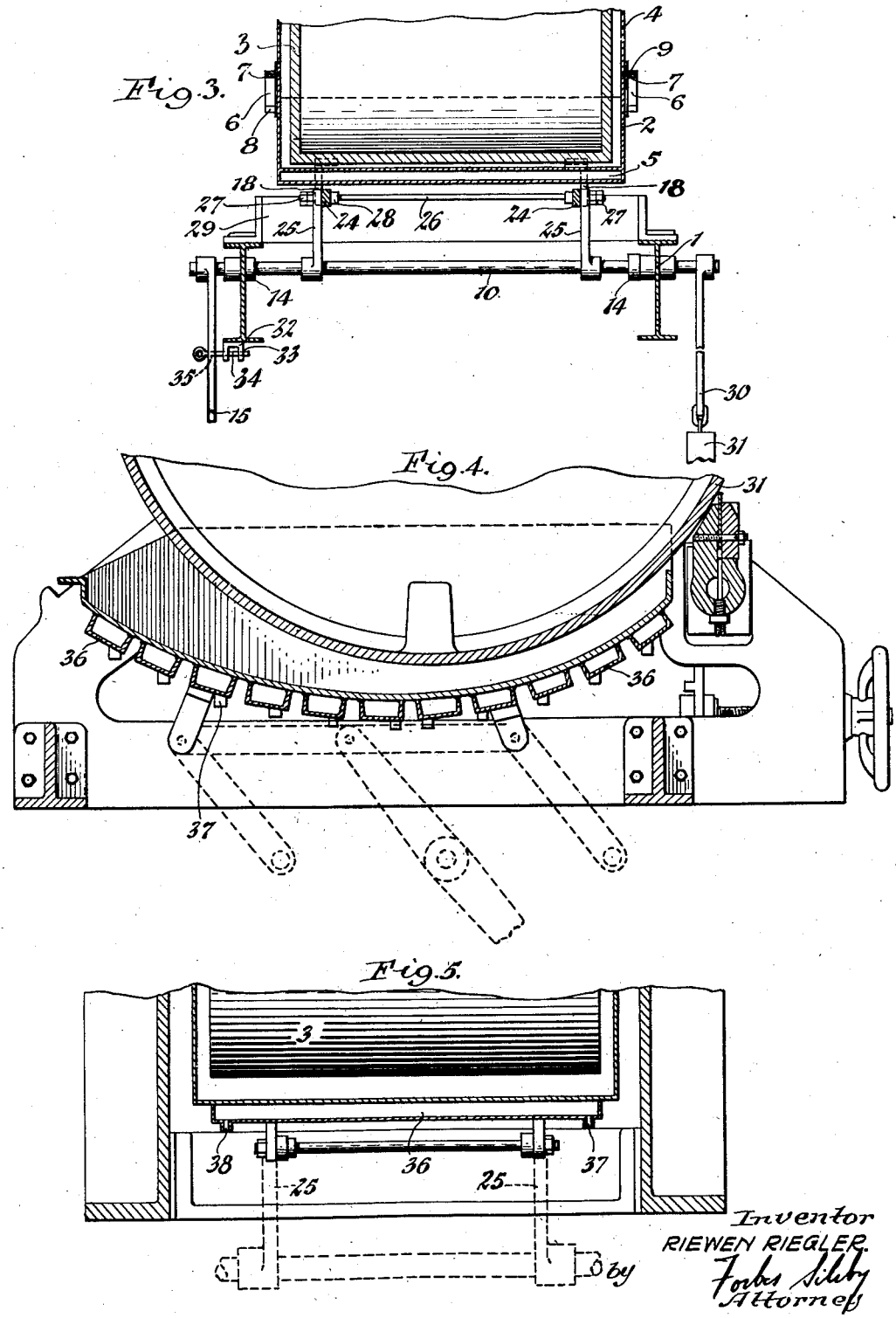

Patented Aug. 6, 1935

2,010,439

UNITED STATES PATENT OFFICE 2,010,439

DIP PAN FOR FLAKING MACHINES

Riewen Riegler, Buffalo, N. Y., assignor to National Aniline & Chemical Company, Inc., New York, N. Y., a corporation of New York Application June 1, 1929, Serial No. 367,813

2 Claims. (Cl. 83—91)

This invention relates to improvements in machines wherein a molten material is dipped from a pan by a revolving drum, on the surface of which it is congealed and subsequently scraped off. More specifically, the invention is concerned with flaking machines for the flaking of phthalic anhydride and similar substances.

Flaking machines of the type herein described consist in general of a rotating drum, the periphery of which is kept cool, a dip or flaker pan or its equivalent for containing in molten condition the material to be flaked, beneath the surface of which molten material the lower periphery of the drum dips, and a scraper for removing congealed material from the surface of the drum as it rotates. In known machines of this construction there is no provision whereby the interior of the aforesaid dip pan is made readily accessible for cleaning. This constitutes a considerable disadvantage in such machines since it is necessary to clean the dip pan at frequent intervals.

The difficulties encountered in the flaking of material such as phthalic anhydride will illustrate the necessity for frequent cleaning of the dip pan. Crude molten phthalic anhydride is, for example, introduced into a still, where it is refined under suitable conditions until the material becomes clear water-white. The refined material is then distilled and introduced into the flaker pan and continuously flaked. However, the tailings coming over toward the end of the distillation are contaminated with impurities which pass over with the phthalic anhydride. Also, any small quantities of water which may collect in the flaker pan will hydrolyze the phthalic anhydride to phthalic acid, which contaminates the product; and furthermore on cooling, the acid forms a hard deposit in the pan so difficult to remove that it must often be chipped out with an iron bar. These tailings are usable for some purposes, however, and it is desirable to flake this product in the same machine as is used for the purer product, thus eliminating the use of another machine. However, after flaking a quantity of these tailings, the deposit in the flaker pan must be removed before a new batch of phthalic anhydride is run into the pan, for otherwise the first runnings will be contaminated by impurities. By removing these impurities periodically, the deleterious effects thereof will be avoided.

It is obvious, therefore, that a construction which will permit the interior of the flaker pan to be reached with facility is of great importance. In the old type of flaker, the pan is rigidly secured and is accessible only after the flaker roll casing has been removed. The removal of the casing is troublesome and time consuming, and necessitates a long shut down of the machine for the purpose of cleaning. This invention has for its object the provision of a flaking machine wherein the flaker pan can be readily removed or displaced manually so that it will be accessible for cleaning or repair. This and other objects are accomplished by the construction and arrangement described in the following specification taken in connection with the drawings.

In the drawings, Figure 1 is a vertical section of the machine taken along the line 1—1 of Figure 2; Figure 2 is a top plan view of the supporting structure and pan displacing mechanism, the flaking mechanism being removed; Figure 3 is a vertical section taken along the line 3—3 of Figure 2, showing in plan the pan displacing mechanism; Figure 4 shows a flaker pan of modified construction, and Figure 5 shows a cross section of the modified flaker pan.

Referring to the drawings, the numeral 1 indicates the frame of the machine upon which is mounted the mechanism for supporting and displacing the flaker pan 2, and upon which the flaker drum 3 is mounted, by means of a shaft journaled in suitable bearings. A casing 4 covers the drum. In operation, the lower portion of the drum dips into the pan 2 which has a curvature in its bottom which substantially follows the periphery of the drum. The periphery of the drum is cooled by the circulation of water, or other cooling medium, through the interior of the drum. As the lower portion of the drum emerges it carries along on its surface a film of material which cools and hardens. This film is flaked off by the adjustably mounted doctor 3'. The pan 2 is heated by suitable means, as by steam circulating through the jacketed bottom 5. As an alternative design the jacket may be replaced by a series of channels 36 welded to the outer bottom surface as shown in Figure 4. Inlet and outlet means 37, 38, respectively, are provided on each channel for the circulation of hot water, steam or other heating medium. By this construction, leakage of water into the pan is prevented. The angle bars 6, 7 are secured at the top and end, respectively, of the flaker pan, one on each side constituting flanges therefor, and coact with the angle bars 8, 9 forming corresponding flanges for the casing, to provide a tight joint between the casing and pan when the pan is in operative position.

The mechanism for supporting the flaker pan in operative position and displacing the pan into inoperative position, is mounted on the rotatable main shaft 10 suitably journaled in the frame 1, and auxiliary supporting shafts 11, 12 passing through the frame of the machine. The shafts 11 and 12 are held against lateral movement by any suitable means, as by the nuts 13 screwed onto the threaded ends of the shafts. The collars 14, secured to the shaft 10 on the inner side of the bearings, hold this shaft against lateral movement while permitting its rotation. An operating lever 15 is rigidly secured to the shaft 10 at one end whereby the shaft may be rotated to move the pan away from or towards the drum by means presently to be described.

Auxiliary supporting shafts 16 and 17 pass through the lugs 18, 19 projecting from the bottom of the flaker pan, and are held against lateral movement by the lock nuts 20 screwed onto the threaded ends of the shafts. Four parallel links 21 of equal length connect the auxiliary supporting shafts 16, 17 with the corresponding auxiliary supporting shafts 11, 12. The collars 22 and 23 secured to the shafts 11, 12 and 16, 17 hold the links against lateral movement along the shafts. The shafts 16 and 17 are interconnected at their ends by means of the two connecting links 24 secured at their ends. It is apparent that the flaker pan, by reason of the parallel link connection just described, is free to move about the auxiliary supporting shafts 11, 12 as fixed pivots, while the shafts 16, 17 act as revolving pivots, thus keeping the pan always on a plane parallel to its original position.

The arms 25 are secured to the rotatable main shaft 10, and are pivotally secured at directly opposing positions on the connecting links 24, by means of the shaft 26. The shaft 26 is held against lateral displacement by the lock nuts 27 screwed on the ends of the shafts, and the collars 28 prevent lateral movement of the arms 25 along the shaft 26.

In Figure 1 the pan is shown in operative position with the lower portion of the drum dipping below the surface of the liquid material contained therein. When it is desired to displace the pan for the purpose of cleaning it, or for any other purpose, the end of the lever 15 is lowered, thus causing a rotation of the main shaft 10. The rotating movement of the arms 25 secured to the main shaft, is resolved into lateral and vertical components by means of the parallel link construction described, and causes the lowering of the pan while at the same time the pan is moved forward and away from the drum without being tilted until it comes in contact with the stops 29 in the position shown by dotted lines in Figure 1. In this position the inside of the pan is readily accessible for cleaning, etc.

To replace the pan, the lever 15 is raised, thus reversing the direction of movement of the shaft 10 which causes the return of the pan to operating position. Operation of the lever 15 is facilitated by the arm 30 secured at the end of the shaft 10 opposite to the operating lever 15 and carrying a counterweight 31 of suitable mass. In operative position, the pan is held in place by suitable locking means cooperating with the lever 15. The locking means shown comprises a bracket 32 drilled at 33 to receive the locking pin 34. A hole 35 is drilled through the arm 15, which registers with the holes 33 in the bracket 32 when the pan is in operative position. By inserting the locking pin 34 through the hole 35 and the holes 33 in the bracket 32, the lever 15 is held against movement, thus retaining the flaker pan in place. To displace the flaker pan it is only necessary to remove the locking pin and permit the pan, by its own weight aided by the necessary force applied to the lever 15, to drop down until it rests on the stops 29.

As an alternative locking means the arm 25 may be replaced by a slotted toggle link of the well-known type which cooperates with a stop to hold the pan in operative position.

It will be apparent from the foregoing description that the herein described invention effects an improvement in flaking machines of the type wherein a cooled revolving drum dips into a pan containing molten material, by altering the construction of such machines to permit ready accessibility to the dip pan for the purpose of cleaning and removing caked material. Also, by forming the bottom of the pan to closely follow the curvature of the aforesaid flaker drum, the quantity of material remaining in the pan after the flaking operation, is reduced. The invention is of particular advantage where one flaker must be used for more than one product, and permits the thorough cleaning of the machine before treating a different kind of material.

While there has been described above the preferred embodiment of the invention, it will be obvious that many different classes of materials may be flaked in the apparatus and also that the improvement is useful in machines wherein the material is not flaked but is merely congealed and scraped off the drum in solid or semi-solid condition. Minor modifications may be made in the construction within the scope of the invention and it is desired that the invention be not limited except as set forth in the accompanying claims.

I claim:

1. In a flaking machine having a horizontally disposed movable pan for supporting liquid material, a rotary flaking roll dipping into the pan and adapted to retain a film of the material thereon and cause congelation thereof, and means for removing congealed material from the roll, the improvement which comprises a casing covering said flaking roll and having flanged edges, flanged edges on said pan congruent with the flanged edges of the casing and which coact therewith to produce a tight joint and thereby substantially completely encase the flaking roll, means for moving said pan laterally and vertically so as to bring the flanged edges of the pan into and out of register with the flanged edges of the casing, and for retaining said pan during said movement in a plane parallel to its original position, said means comprising a plurality of links connected to the pan by movable pivots the axes of which are spaced apart, said links being mounted to rotate about fixed pivots, the axes of said fixed pivots being spaced apart the same distance as the axes of said movable pivots, and the distance between the fixed pivot and the movable pivot of a link being substantially the same for all of said links, and heating means arranged to maintain the material in said pan at an elevated temperature.

2. In a flaking machine having a horizontally disposed movable pan for supporting liquid material, a rotary flaking roll dipping into the pan and adapted to retain a film of the material thereon and cause congelation thereof, and means for removing congealed material from the roll, the improvement which comprises a casing covering said flaking roll having an opening to permit access to said roll, edges on said pan congruent with the edges of the casing defining said opening, and which coact therewith to produce a tight joint and thereby substantially completely encase the flaking roll, means for moving said pan laterally and vertically so as to bring the edges of the pan into and out of register with the edges of the casing, and for retaining said pan during said movement in a plane parallel to its original position, said means comprising a plurality of links connected to the pan by movable pivots, the axes of which are spaced apart, said links being mounted to rotate about fixed pivots, the axes of said fixed pivots being spaced apart the same distance as the axes of said movable pivots, and the distance between the fixed pivot and the movable pivot of a link being substantially the same for all of said links.

RIEWEN RIEGLER.